United States Patent Office 3,753,999
Patented Aug. 21, 1973

3,753,999
2-THIOCYANOMETHYLSULFONYL BENZOTHIAZOLE
Albert Tempel and Hendrik Dolman, Van Houtenlaan, Weesp, Netherlands, assignors to North American Philips Co., Inc., New York, N.Y.
No Drawing. Filed Oct. 7, 1968, Ser. No. 765,672
Claims priority, application Netherlands, Oct. 10, 1967, 6713712
Int. Cl. C07d 91/44
U.S. Cl. 260—306.6 R          1 Claim

ABSTRACT OF THE DISCLOSURE

Fungicidal compositions containing sulphoxyl or sulphonyl methylene rhodanide and substitution products thereof.

---

An excellent fungicidal activity was found of compounds of the general formula

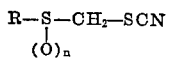

in which formula R is an alkyl group, a benzyl group substituted in the aromatic ring by one or several halogen atoms, or a radical or a compound having a heteroxycyclic nucleus with aromatic character, which nucleus contains 1–3 hetero atoms selected from the group consisting of nitrogen atoms and sulphur atoms, and $n$ has the value 1 or 2. After processing to suitable compositions, the compounds are capable of protecting the leaf and seed of a variety of plants against mould infections. Furthermore the compounds are capable of combating or controlling moulds on textile, paper pulp, paint or wood. The compounds according to the invention also show an activity against fungi occurring in man and animal, for example, cutaneous fungi, for example, Trichophyton rubrum, Trichophyton mentagrophytes, Microsporum canis, Epidermophyton floccosum and sytemic fungi, for example, Aspergillus niger and Candida albicans. The compounds are generally little phytotoxic and also little toxic for warm-blooded animals.

If in the above mentioned general formula R is a benzyl group substituted in the aromatic ring by halogen atoms, the halogen atom preferably is a chlorine atom and the number of substitutions is 3. If R contains a heterocyclic nucleus, said nucleus is preferably selected from the group consisting of pyridine, thiophene, pyridazine, thiadiazole-1.2.4, thiadiazole-1.3.4 and benzthiazole. Furthermore the above mentioned heterocyclic nuclein may contain one or several substituents which are selected from the group consisting of a halogen atom, preferably a chlorine atom, an alkyl group having 1–6 carbon atoms, a phenyl group and the group —SO₂—CH₃.

If R is an alkyl group, said group preferably contains 1–12 C atoms, for example, an n-pentyl group, an n-octyl group or a decyl group.

Interesting substances according to the invention are the compounds of the formulae:

1
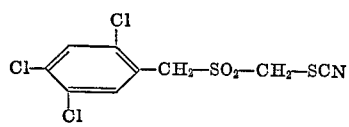

2
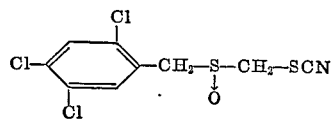

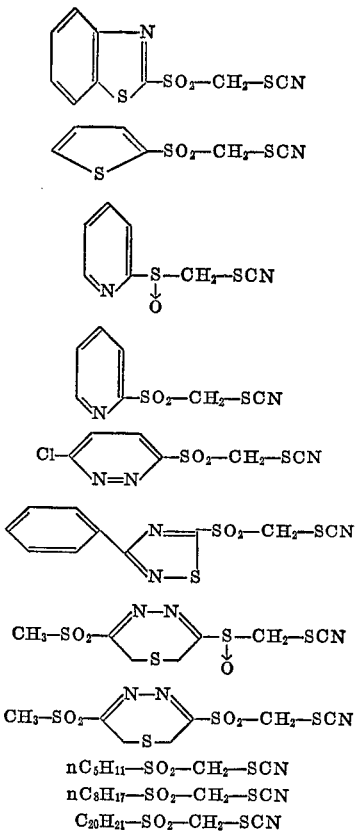

11  nC₅H₁₁—SO₂—CH₂—SCN
12  nC₈H₁₇—SO₂—CH₂—SCN
13  C₂₀H₄₁—SO₂—CH₂—SCN

It has been found in experiments that with the compounds according to the invention the germination can be inhibited of spores of *Fusarium culmorum, Venturia inaequalis, Phytophtora infestans* (tomato leaf) *Cercospora beticola* (beet leaf) *Septoria apii* (celery leaf), *Plasmopara viticola* (grape leaf) *Botrytis cinerea* (salad leaf) and *Piricularia oryzae* (rice).

Therefore the substances may be used, for example, in the form of wettable powders in the preventive control or mould infections in, for example, beets, potatoes, vegetables, fruit, rice and in the vine culture.

The compounds according to the invention are more particularly suitable for the preventive control of mould infections on leaves and for preventing mould infections in agricultural and horticultural seeds. For that purpose the compounds may be processed in the conventional manners to so-called miscible oils, wettable powders or seed disinfectants. Of miscible oils and wettable powders fine dispersions in water can easily be prepared which are then sprayed, nebulized, atomized, or dusted on the crop to be protected in the conventional manner. Herefor aqueous dispersions are generally considered which contain 50–500 gms. of active substance per 100 l. of aqueous dispersion. For the preparation of a number of miscible oils, wettable powders and seed disinfectants reference is made to the examples.

Other active fungicidal or pesticidal, for example, insecticidal compounds may also be processed in the agents according to the invention as a result of which the advantage is obtained that the range of activity of such an agent is increased or that synergistic effects are obtained.

Compounds which are suitable for being used as active constituents together with the compounds according to the invention in pesticidal compositions are, for example, fungicidal compositions, such as organic mercury compounds, for example, phenyl mercury acetate and methyl mercury cyanoguanidine, organic tin compounds, for example, triphenyl tin hydroxide, and triphenyl tin acetate, dialkyl dithiocarbamates, for example, zinc dimethyl carbamate, alkylene bisdithiocarbamates, for example, zinc ethylene bisdithiocarbamate, zinc propylene bisdithiocarbamate, manganese ethylene bisdithiocarbamate, and combinations of zinc- and manganese-ethylene bisdithiocarbamates, dinitrophenols, for example, 2,4-dinitro-6-(2-octyl) phenylcrotomate and 2,4-dinitro-6-sec-butylphenylacrylate, and in addition 1-[bis(dimethylamino)phosphoryl]-3-phenyl-5-amino-1,2,4-triazole,
6-methyl-quinoxaline-2,3-dithiocarbonate,
1,4-dithioantraquinone-2,3-dicarbonitrile,
N-trichloromethylthio-phthalimide,
N-trichloromethylthiotetrahydro-phthalimide,
N-(1,1,2,2-tetrachloroethylthio)-tetrahydrophthalimide,
N-dichlorofluoromethylthio-N-phenyl-N'-dimethylsulphonildiamide and Tetrachloroisophthalonitrile as well as insecticidal compounds, for example, chlorinated hydrocarbons, for example, 2,2-bis-(p-chlorophenyl)-1,1,1-trichloroethane and hexachloro-epoxy-octahydro - dimethanonaphthalene, organic phosphorus compounds, for example, O,O-diethhyl-O-p-nitrophenylphosphorthioate, O,O - dimethyl - S - 1,2-di(ethoxycarbamyl)ethyl - phosphordithioate and O,O-diethyl-O-2-(ethylthio)ethyl-phosphorthioate and carbamates, for example, methylnaphthylcarbamate.

The compounds according to the invention are new substances which can be prepared according to methods which are known per se for the preparation of analogous compounds. For example the new compounds may be obtained according to methods which are based on the reaction equations below. It is to be noted that those skilled in the art will experience no difficulties in preparing the new compositions according to the method stated in the reaction equations.

(A) R—S—H + H—Hlg + CH₂O ⟶ R—S—CH₂—Hlg

R—S—CH₂—Hlg + MeSCN ⟶

R—S—CH₂—SCN + MeHlg $\xrightarrow{\text{oxidation}}$ R—SO₂—CH₂—SCN

In these formulae R is an alkyl group, Hlg a halogen atom, preferably a chlorine atom, and Me is a metal atom, for example, an alkali atom or alkaline earth atom, for example, Na, K or Mg.

(B) R—S—H + H—Hlg + CH₂O ⟶ R—S—CH₂—Hlg

R—S—CH₂—Hlg + MeSCN ⟶

R—S—CH₂—SCN + MeHlg $\xrightarrow{\text{oxidation}}$ R—S(O)ₙ—CH₂—SCN

In these reaction equations the symbols Hlg and Me have the above-mentioned meanings, R is a benzyl group substituted in the aromatic ring by one or several halogen atoms, and n has the value 1 or 2.

(C) R—S—Me + Hlg—CH₂—SCN ⟶

R—S—CH₂—SCN $\xrightarrow{\text{oxidation}}$ R—S(O)ₙ—CH₂—SCN

In these formulae R is a radical of a compound having a heterocyclic nucleus with aromatic character, which nucleus contains 1 to 3 hetero atoms selected from the group consisting of nitrogen atom and sulphur atom, and Me, Hlg and n have the meanings already mentioned above.

In the oxidation reaction m-chloroperbenzoic acid may advantageously be used, while other peracids, for example, perbenzoic acid or peracetic acid are also to be considered. In addition KMnO₄, K₂Cr₂O₇ or CrO₃ in glacial acetic acid may be used, while in addition normal oxygen or air under the influence of catalysts may yield good results, for example, by leading the gas through the reaction medium.

By a correct dosing of the oxidation agent or by a suitable choice of the reaction temperature, the oxidation reactions mentioned sub B and C can be terminated upon the formation of the sulphoxide.

The sulphides mentioned in the above reactions A, B and C may alternatively be prepared according to a method which is based on the following reaction equations:

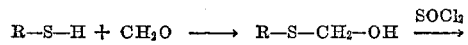
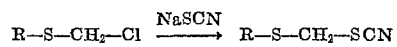
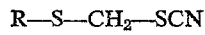

The rhodane sulphides of the formula

R—S—CH₂—SCN in which R is a benzyl group substituted in the aromatic ring by one or several halogen atoms or is the group

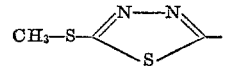

can easily be isolated and are important intermediate products for the preparation of the fungicidal compounds according to the invention. These intermediate products also have a fungicidal activity.

(1) Preparation of 2,4,5-trichlorobenzyl-rhodane methyl sulphoxide

A mixture of 27.6 gms. of 2,4,5-trichlorobenzylmercaptane and 6.7 gms. of paraformaldehyde in 50 mls. of methylene chloride was cooled to —10° C. while stirring. Then hydrochloric acid gas dried on H₂SO₄ was led in for approximately 1 hour, the temperature of the mixture being kept for approximately —50° C. After the addition of CaCl₂, the whole was stored at room temperature for 24 hours. The reaction mixture was processed in the conventional manner by filtration, evaporation and distillation. Yield: 20 gms. of 2,4,5-trichlorobenzyl-chloromethyl-sulphide. Boiling point 142° C./0.8 nm.

A solution of 20 gms. of 2,4,5-trichlorobenzyl-chloromethylsulphide and 7.09 gms. of KSCN in 160 mls. of anhydrous acetone was refluxed for 3 hours, then evaporated and finally taken up in water. After leaving to stand for some time the resulting oil solidified. This solid was dissolved in ether and washed with water two times. The ethereal layer was dried on Na₂SO₄ and treated with norit and evaporated to dryness. The residue was washed with cold isopropanol and recrystallized from the same solvent. The yield was 10 gms. (46%) of 2,4,5-trichlorobenzyl rhodane methylsulphide, melting point 74–75° C. 2.15 gms. of (80%) metachloroperbenzoic acid were added in small portions and while cooling to a solution of 2.98 g. of 2,4,5-trichlorobenzyl chloromethylsulphide in 50 mls. of chloroform, the temperature being kept below 25° C. After leaving to stand overnight the precipitated solid was sucked off and recrystallized from 300 mls. of chloroform. Yield 2.6 gms. (83.8%) of 2,4,5-trichlorobenzylrhodane methylsulphoxide. Melting point 166–169° C. (decomposition).

EXAMPLE 2

Preparation of 2,4,5-trichlorobenzyl-rhodane methylsulphone 5.2 gms. (80% pure) of metachloroperbenzoic acid were added in small portions and while cooling to a solution of 2.98 gms. of 2,4,5-trichlorobenzylchloromethylsulphide (see Example 1) in 50 mls. of chloroform, the temperature remaining below 25° C.

The mixture was refluxed, cooled, and the precipitated solid was sucked off. The filtrate was evaporated and the residue washed with a 5% NaHCO₃ solution. The collected precipitates were recrystallized from isopropanol. Yield 1.0 gm. (30%), melting point 180–182°.

EXAMPLE 3

Preparation of n-amyl rhodane methylsulphone

Hydrochloric acid gas was led into a mixture of 79.1 gms. of n-amyl mercaptane and 22.8 gms. of paraformaldehyde, at a temperature of −5 to −10° C., until a clear solution was obtained. CaCl₂ was then added to the solution which was kept at a low temperature for 30 minutes. The mixture was heated to room temperature and the remaining precipitate was extracted with 300 mls. of methylene chloride. Both the extract and the decanted liquid were dried on CaCl₂ after which the methylene chloride was evaporated and the remaining product was distilled in vacuo. Yield 81 gms. (70%) of n-amyl chloromethylsulphide. Boiling point 57–59° C. at 3 mm. mercury pressure.

To a solution of 12.4 gms. of KSCN and 8.2 gms. of KJ in 1500 mls. of acetone were added while cooling with ice 19.6 gms. of n-amyl chloromethylsulphide. The mixture was stored for 3 days at 0° C. after which the precipitated KCl was sucked off and the filtrate was evaporated in vacuo. Yield 18 gms. of oil (the sulphide). 17.5 gms. of this oil were dissolved in 250 mls. of cold chloroform and 22 gms. of metachloroperbenzoic acid (80%) were then added to the solution. The temperature of the mixture rose to 15° C. After leaving to stand for a few days the precipitated metachlorobenzoic acid was filtered off and 22 gms. of metachloroperbenzoic acid (80%) were added to the filtrate after which this mixture was refluxed for 3 hours. The residue which remained after evaporation was washed with 12 gms. of NaHCO₃ in 100 mls. of water, filtered and stirred with NaHCO₃ in water; drying in air finally yielded 11.5 gms. (40%) of the sulphone, melting point 67–68° C.

EXAMPLE 4

Preparation of n-octyl-rhodane methylsulphone

Hydrochloric acid gas was led into a suspension of 43.8 gms. of n-octylmercaptane and 9 gms. of paraformaldehyde in 50 mls. of methylene chloride while cooling (−10° C.) and for 2½ hours. CaCl₂ was then added and the mixture was left to stand for some time. After the usual processing (filtering, evaporating and distilling) 38 gms. of n-octyl chloromethylsulphate were obtained. Boiling point 69–71° C./0.2 nm.

8.7 gms. of this compound were added to a solution of 4.9 gms. of KSCN and 4.1 gms. of KJ in 500 mls. of acetone which was cooled to −4° C. The mixture was stored at +4° C. for 23 hours and then diluted with 400 mls. of chloroform, water and ice. The organic layer was separated, washed with icy water, dried on magnesium sulphate and cooled to −2° C., after which 19.8 gms. of metachloroperbenzoic acid were added during which a slight temperature rise occurred. The mixture was left to stand overnight in the refrigerator. The next day 3 gms. of m-chloro perbenzoic acid were added and the mixture was refluxed for 2½ hours. Half the solution was evaporated and the precipitate (m-chlorobenzoic acid) was filtered. The solution was then evaporated entirely in vacuo and the residue stirred with 4 gms. of NaHCO₃ in water. The product was washed and then dried in air. Yield 7.4 gms. (33%). After recrystallisation from cyclohexane and a little isopropanol a melting point range of 75.5–76.5° C. was obtained.

EXAMPLE 5

Preparation of n-decyl-rhodane methylsulphone

A mixture of 50.5 gms. of n-decylmercaptane and 8.7 gms. of paraformaldehyde was cooled to −10° C. after which hydrochloric acid gas was led in until a crystalline mass was obtained. The mixture was diluted with 50 mls. of methylene chloride and hydrochloric acid gas led in for 2½ hours.

The mixture was processed in the usual manner. Yield: 32 gms. (50%) of n-decyl-chloromethylsulphide, boiling point 105° C./0.5 mm. 11.15 gms. of this product were added to a solution of 4.9 gms. of KSCN and 4.1 gms. of KJ in 500 mls. of acetone cooled to −4° C.

This mixture was stored in the refrigerator for 18 hours, after which the precipitate (KCl) was sucked off and water and chloroform were added to the filtrate. The chloroform layer was washed with water, filtered and dried, after which 22 gms. of chloroperbenzoic acid were added at a temperature of −10° C. After some time the solution was heated to room temperature, 2½ gms. of metachloroperbenzoic acid were added and the solution was refluxed for 2 hours. After evaporating the solution a solid was obtained which was boiled again with m-chloroperbenzoic acid, evaporated again, the residue processed and recrystallized from cyclohexane. Yield 0.1 gm., melting point 78.5–79° C.

EXAMPLE 6

Preparation of 2-pyridyl-rhodane methylsulphone (sulphoxide)

11.1 gms. of 2-mercaptopyridine were dissolved in a solution of 4.1 gms. of NaOH in 100 mls. of ethanol. The solution was cooled to +4° after which 11.3 gms. of chloromethylrhodanide dissolved in 20 mls. of ethanol were added to the solution. The temperature rapidly rose to 24° C., a precipitate being formed. The precipitate was filtered off and the filtrate diluted with 120 mls. of methylene chloride. After filtration and further diluted with methylene chloride, the methylene chloride layer was separated, washed with water and dried. Half of this solution of 2-pyridyl rhodane methylsulphide was cooled to −10° C. after which 12.1 gms. of m-chloroperbenzoic acid were added. The temperature rose to approximately 15° C. The mixture was cooled in ice for one hour and then stored at room temperature for 12 hours. The precipitate (m-chlorobenzoic acid) was sucked off, the filtrate evaporated and the resulting residue processed and recrystallized from isopropanol. Yield 2.0 gms. (20%) of 2-pyridyl rhodane methylsulphoxide, melting point 120–121° C.

The other half of the solution was evaporated and the residue taken up in 250 mls. of chloroform. To this solution were added, while cooling in ice, 22 gms. of m-chloroperbenzoic acid, after which said solution was kept at room temperature for one hour and was then refluxed for 2½ hours. After cooling in ice the resulting precipitate of chlorobenzoic acid was filtered off and the filtrate processed in the manner already described. Yield: 1.5 gms. (14%) of 2-pyridil rhodane methylsulphone, melting point 105–106° C.

EXAMPLE 7

Preparation 6-chloro-3-rhodane methyl sulphonyl-pyridazine 2.9 gms. of 6-chloro-3-mercapto-pyridazine were dissolved in a solution of 0.8 gm. of NaOH in 50 mls. of methanol. After cooling this solution to +8° C., 2.4 gms. of chloromethylrhodanide were added and the mixture was then stirred at room temperature for 1½ hours. Dilution with water yielded a solid (the sulphide). 2.5 gms. of this solid were dissolved in 30 mls. of chloroform. 6.7 gms. of m-chloroperbenzoic acid were added to the solution and further processed in the same manner as described in Example 4. Yield 1.1 gms. (38%). Melting point 162.5–164.5° C. (decomposition).

EXAMPLE 8

Preparation of 2-benzthiazolyl-rhodane methylsulphone

In the same manner as described in Example 7, the sulphide was prepared from 2-mercaptobenzthiazole and chloromethyl-rhodanide. 11 gms. of this sulphide (oil) were dissolved in 100 mls. of glacial acetic acid and 15.5 mls. of 30% H₂O₂ were added to the solution.

The solution was heated and kept at a temperature of 60° C. for approximately 8 hours. After cooling the reaction mixture was poured in water and extracted (chloroform). The chloroform layer was processed in the usual manner and the resulting product recrystallized from ethanol. Melting point 129.5–131° C.

EXAMPLE 9

Preparation of 2-rhodane methylsulphonylthiophene 5.8 gms. of 2-mercaptothiophene were dissolved in a solution of 2.0 gms. of NaOH in 150 mls. of methanol. The solution was then cooled to 7° C. after which 5.9 gms. of chloromethylrhodanide were added. The reaction mixture was processed in the same manner as described in Example 7, 9.3 gms. of 2-rhodane-methylthiophene sulphide being obtained (oil). The sulphide was dissolved in 100 mls. of glacial acetic acid and 10 mls. of 30% $H_2O_2$ were then added to this solution, the temperature rising from 20–30° C. After leaving to stand overnight at room temperature, another 10 mls. of 30% $H_2O_2$ were added, the mixture heated to 40° C. and kept at this temperature for 7 hours. Again 10 mls. of 30% $H_2O_2$ were added, heated to 60° and kept at this temperature for approximately 10 hours.

After cooling the mixture was poured in water, and the resulting oil was extracted with methylene chloride, after which said extract was washed with water, then dried and finally evaporated. The residue was recrystallized from isopropanol. Yield 1.6 gms. Melting point 89–89.5° C.

EXAMPLE 10

Preparation of 2-methylsulphonyl-5-rhodane-methylsulphoxyl-1,3,4-thiadiazole 14.3 gms. of 2-methylmercapto-5-mercapto-1,3,5-thiadiazole, 6.6 gms. of KJ and 10.2 gms. of chloromethylrhodanide were added to a solution of 2.0 gms. of sodium in 250 mls. of methanol. The mixture was boiled for 1 hour, the methanol being distilled off during the last 20 minutes.

Cooling and diluting with icy water yielded a solid which was washed with isopropanol and petroleum (60–80) and finally processed to a pure product. Yield 40 gms. (70%) of 2-rhodane methyl mercapto 5-methyl mercapto 1,3,4-thiadiazole.

2.5 gms. of this sulphide were dissolved in 500 mls. of chloroform and boiled for 3 hours with 12 gms. of m-chloroperbenzoic acid. The solution was dried, evaporated and the residue purified. Yield 0.3 gm., melting point 147–147.5° C.

EXAMPLE 11

Preparation of 3-methyl-5-rhodanemethylsulfonyl-1,2,4-thiadiazole 5.08 gms. of 3-methyl-5-mercapto - 1,2,4 - thiadiazole were added to a solution of 1.44 gms. of NaOH in 150 mls. of methanol. The solution was filtered and cooled to 5° C. after which 4.55 gms. of chloromethyl rhodanide and approximately 1 gm. of KJ were added. The reaction mixture was refluxed for 1 hour, then cooled and finally poured out in water. The resulting oil was extracted with chloroform and the extract was dried and finally evaporated. The residue was a yellowish brown oil which was not purified but immediately dissolved in 100 mls. of dry chloroform after which 15 gms. of m-chloroperbenzoic acid were added. This mixture was boiled for 3 hours, then evaporated to dryness, and after processing the residue was recrystallized from isopropanol. Yield: 1.5 gms. Melting point 101.5–102.5° C.

EXAMPLE 12

Preparation of 3-phenyl-5-rhodane methylsulphonyl-1,2,4-thiadiazole 5.82 gms. of 3-phenyl-5-mercapto - 1,2,4 - thiadiazole were dissolved by boiling in a solution of 1.2 gms. of NaOH in 150 mls. of methanol. Approximately 1 gm. of KJ and 3.23 gms. of chloromethylrhodanide were added to this solution. After boiling for 1 hour the solution was neutral and was poured out in water. The resulting oil solidified after leaving to stand for 1 hour. The solid was recrystallized from cyclohexane and then from isopropanol with norit. Yield 1.9 gm. of the sulphide, melting point 113–115° C. 1 g. of this sulphide was dissolved in 20 mls. of chloroform to which 1.0 gm. of m-chloroperbenzoic acid was added. The mixture was refluxed for three hours and evaporated to dryness. The residue was processed in the usual manner.

Yield 0.14 gm. Melting point 125.5–126.5° C.

EXAMPLE 13

The compounds mentioned in columns 1 and 2 were processed to wettable powders by mixing of each of these substances 50 parts by weight in a mill with 40 parts by weight of a mixture consisting of natural and synthetic silicates, 7 parts by weight of sodium lignine sulphonate and 3 parts by weight of sodium oleyl-N-methyl taurate.

EXAMPLE 14

Miscible oils of the compounds mentioned in columns 1 and 2 were prepared by taking up 25 parts by weight of one of the active compounds together with 5 parts by weight of a mixture (1:1) of alkyl phenol polyglycolether and calcium dodecylbenzene sulphonate in 70 parts by weight of xylene.

TEST METHODS

The compounds according to the invention were tested according to the methods below.

For the spore germination and leaf tests, 31 mgms. of the substance to be tested were ground in a glass mill together with 3 mgms. of a surface-active substance in three drops of water for 15 minutes and then taken up in 10 mls. of water. Starting from this suspension, the test suspensions were prepared in the concentrations to be used by diluting with water. The suspensions were sprayed on the leaves or plants by means of a fine spray gun. A different formulation was used in the Piricularia test (see below).

In the seed disinfection tests, 20 and 10 mgms., respectively, of the substance were rubbed in a mortar and diluted with 20 and 30 mgms. respectively, of talcum.

In the soil disinfection test (*Rhizoctonia solani*) as in the leaf tests, the substance was ground in a glass mill and mixed with Tween 20.

(a) Spore germination test

Drops of a series of test suspensions of the substance (concentration series increasing by 0.3 pC unit) mixed with conidia of *Fusarium culmorum* and of *Venturia inaequalis* were deposited on object glasses. Each object glass was individually placed in a closed moist space at a temperature of 23° C. After 24 hours the minimum concentration of the substance at which germination was still fully inhibited (MLD) was established.

(b) *Phytophtora infestans*

Cut leaves of tomato plants of the variety "Bonny Best" were sprayed with various concentrations of the suspension of the substance. For that purpose, 9 leaves were spread horizontally with their lower sides upwards on a piece of filtering paper of 1000 sq. cm. and over this surface 5 mls. of the suspension were divided by means of a nebulizer. The leaves were then placed with their stems in a bottle of water. When the spray liquid had dried up, the leaves were infected with a suspension which contained 100,000 zoospores of the mould *Phytophtora infestans* per ml. These zoospores were obtained from a culture of the mould on potato tubers. The bottles with leaves were placed in a dark space at a relative humidity of 95–100% and a temperature of 15° C. After 24 hours the space was illuminated with fluorescent tubes of the day-light type to a light intensity of 3000–6000 lux at the height of the plants; as a result of this the temperature rose to 18° C. After 3–4 days, black speckles had developed throughout the surface of the leaves of the non-treated control leaves.

(c) *Cercospora beticola*

Potted beet leaves of the variety "Bison," in the 3–5 leaf-stage, were sprayed with the text suspensions (5 mls. per 6 plants). After drying up of the spray liquid, the plants were infected with a suspension of pulverized mycelium of *Cercospora beticula* cultivated on an agar culture medium (approximately 500,000 mycelium fragments per ml.). Incubation occurred at 21° C. in an air-conditioned space which was illuminated 16 hours per 24 hours (as with *Phytophtora infestans*), while the relative humidity of the air was increased as much as possible. After approximately 14 days typical leaf spots had developed particularly on the youngest leaves.

(d) *Septoria apii*

Potted celery plants of the variety "Balder," in the 5–6 leaf-stage were sprayed with the test suspensions (5 mls. per 6 plants). After drying up of the spray liquid the plants were infected with spores obtained from infected leaves sprayed as a suspension with 150,000 spores/ml. Incubation took place at 18° C. in an air-conditioned space which was illuminated 16 hours per 24 hours (as with *Phytophtora infestans*) while the relative humidity of the air was increased as much as possible. After approximately 14 days the typical symptoms of leaf spot were found to have developed.

(e) *Plasmopara viticola*

Small young vine leaves cultivated in the glass-house (variety "Frankenthaler") were sprayed on the lower side for half of the leaf with test suspensions of the substance to be tested, 5 mls. being dosed per 1000 sq. cm. Then the spray liquid had dried up the leaves were laid on moist filtering paper in petri dishes. On the sprayed and non-sprayed half of each leaf, 10 drops were deposited of a sporangia suspension of *Plasmopara viticola* (100,000 zoosporangia per ml.), originating from infested leaves of the preceding experiments. Incubation took place at 24° C. in an air-conditioned space which was illuminated 16 hours per 24 hours (as with *Phytophtora infestans*). 24 hours after the deposition the drops were removed by means of a piece of filtering paper. Six days after the infection the number of false mildew spots was counted.

(f) *Botrytis cinerea*

Salad leaves (dimensions approximately 4 x 6 cms.) originating from seedlings from the variety "Meikoningin" cultivated in the glass-house were sprayed for half of the leaf on the lower side with suspensions of the substances to be tested, 5 mls. per 1000 sq. cm. being dosed. When the spray liquid had dried up the leaves were laid on moist filtering paper in petri dishes. Before closing the petri dishes, the leaves were infected with a suspension of pulverized mycelium of *Botrytis cinerea* cultivated in a shaking culture. Incubation took place at 21° C. in an air-conditioned space which was illuminated 16 hours per 24 hours (as with *Phytophtora infestans*). After 2 days necrotic spots had developed throughout the surface of the leaves.

(g) *Piricularia oryzae*

Rice sowed in pots (approximately 25 plants per pot having diameters of 8 cms.) were sprayed in the second-leaf-stage with a test suspension to which 0.05% of Na-oleate and 0.25% of gelatin had been added. After the spray liquid had dried up, the plants were infected by spraying with a suspension of 200,000 spores per mls. which spores had been obtained from a culture of *Piricularia oryzae* cultivated to an Agar culture medium. Incubation took place in circumstances with a high relative humidity of the air at 23–26° C. while the plants were illuminated with fluorescent tubes for 16 hours per 24 hours. After approximately 5 days, the plants showed the typical leaf blast symptoms.

(h) *Venturia inaequalis* (test in the experimental garden)

Shoots of apple root stocks type $M_2$ were sprayed until "run off," with a suspension of a substance formulated to a wettable powder which contain 50% of active compound. After the spray liquid had dried up, the shoots were infected with a spore suspension which contained 180,000 conidia per ml. originating from apple leaves infested by *Venturia inaequalis*. The shoots were then encapsulated in plastics and rained for 24 hours. After 2 or 3 weeks the plants showed the typical scab symptoms.

(i) Duration of action on tomato leaf

The upper sides of the leaves of potted tomato plants (15–20 cm. high) of the variety "Bonny Best" were sprayed with the test suspensions. The plants were placed in a glass-house. After 96 or 168 hours another group of plants were sprayed in the same manner with the same substances. After the spray-liquid hereof had dried up, both groups of plants were infected with a suspension containing 100,000 zoospores of the moul *Phytophtora infestans* per ml., of which 1.5 mls. were sprayed per plant. The plants were placed under a plastic hood and kept moist. After 4 days the typical Phytophtora spots had developed on the leaves which had not sufficiently been protected by a chemical.

(k) Seed disinfection of wheat seed infested with Fusarium 10 gms. of wheat seed infected naturally with Fusarium species were treated with a powdered formulation (see 2) of the substance to be tested, by keeping seed and powder in a closed box in a rotating movement for some time. The treated seed was then laid on moist filtering paper and successively placed for 3 days at 10° C. and 3 days at 20° C. The roots of the resulting seedlings then showed the typical symptoms as a result of the infestation by Fusarium species.

(l) Soil disinfection

The substance to be tested was mixed with unsterilized soil and the soil was then infected with a quantity of a pulverized shaking culture of *Rhizoctonia solani*. Pieces of Flax straw, length approximately 5 cm. were inserted in the soil vertically. After 24 hours, said straws were rinsed with tap water and laid horizontally on a two percent water-agar culture. 24 hours later it was checked whether *Rhizoctonia solani* had started growing around the straw.

What is claimed is:
1. A compound of the formula

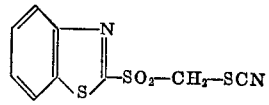

References Cited

UNITED STATES PATENTS

| | | | |
|---|---|---|---|
| 2,413,917 | 1/1947 | Harman | 260—306.6 |
| 2,932,649 | 4/1960 | Metivier | 260—307.4 |

FOREIGN PATENTS

| | | | |
|---|---|---|---|
| 967,469 | 8/1964 | Great Britain | 260—306.6 |

ALEX MAZEL, Primary Examiner

R. J. GALLAGHER, Assistant Examiner

U.S. Cl. X.R.

260—250 A, 294.8 R, 302 SD, 329 S, 454; 424—245, 250, 263, 270, 275, 302

UNITED STATES PATENT OFFICE
CERTIFICATE OF CORRECTION

Patent No. 3,753,999      Dated August 21, 1973

Inventor(s) ALBERT TEMPEL ET AL

It is certified that error appears in the above-identified patent and that said Letters Patent are hereby corrected as shown below:

Column 1, line 27, change "or" (second occurrence) to --of --.

Column 2, formula 13, "$C_{20}H_{21}-SO_2-CH_2-SCN$" should be $$C_{10}H_{21}-SO_2-CH_2-SCN$$ --.

line 58, change "100 1." to -- 100 1. --.

Column 5, line 51, "3" should be -- 2 --.

Column 10, line 24, "moul" should be -- mould --.

Signed and sealed this 1st day of January 1974.

(SEAL)
Attest:

EDWARD M. FLETCHER, JR.
Attesting Officer

RENE D. TEGTMEYER
Acting Commissioner of Patents